June 25, 1968     K. R. TAYLOR     3,389,561
METHOD OF AND APPARATUS FOR PROVIDING ANCHORS
IN EARTH AND/OR ROCK FORMATIONS
Filed May 23, 1966     3 Sheets-Sheet 1
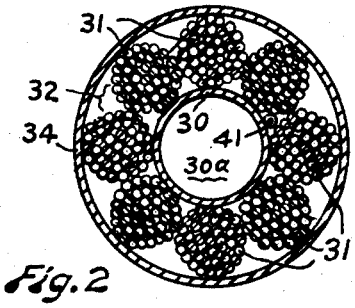
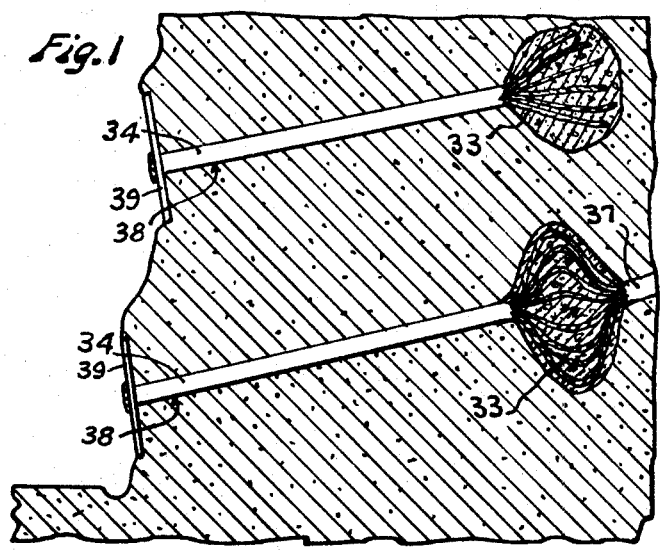
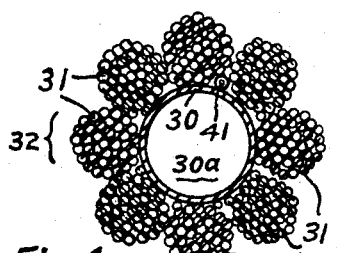
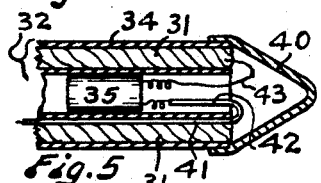
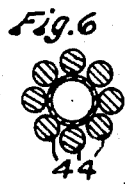
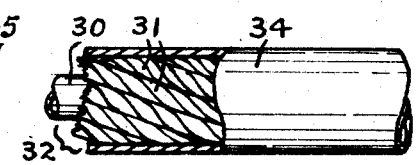
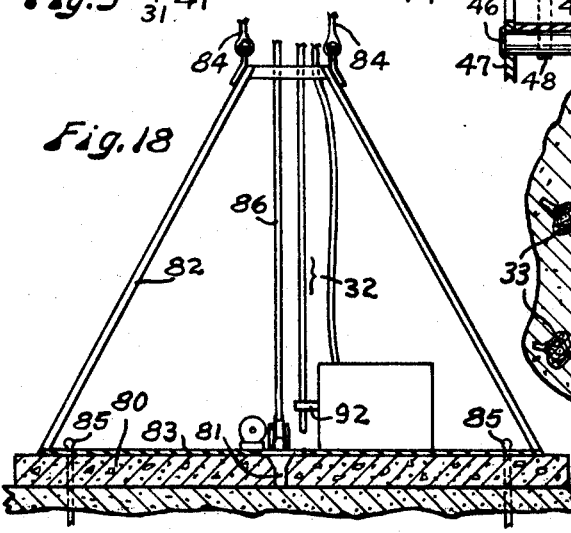
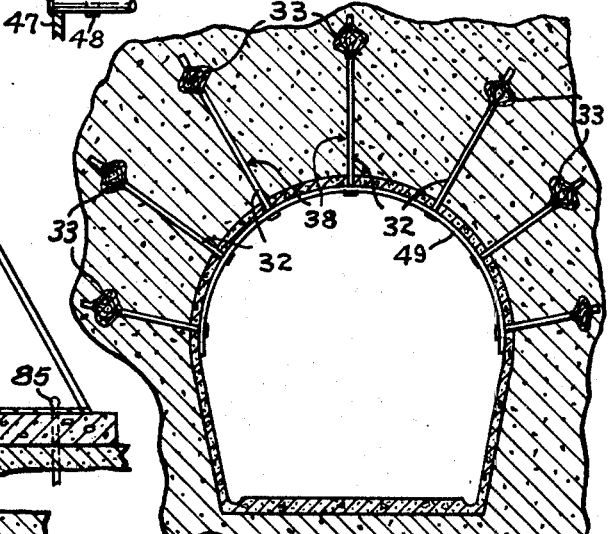
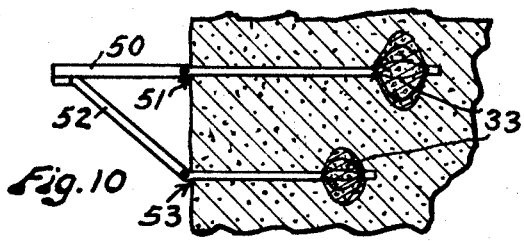
INVENTOR.
Kenneth Ray Taylor
BY
ATTORNEY.

June 25, 1968  K. R. TAYLOR  3,389,561
METHOD OF AND APPARATUS FOR PROVIDING ANCHORS
IN EARTH AND/OR ROCK FORMATIONS
Filed May 23, 1966  3 Sheets-Sheet 2
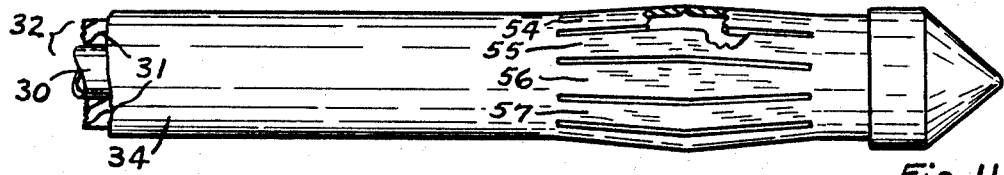
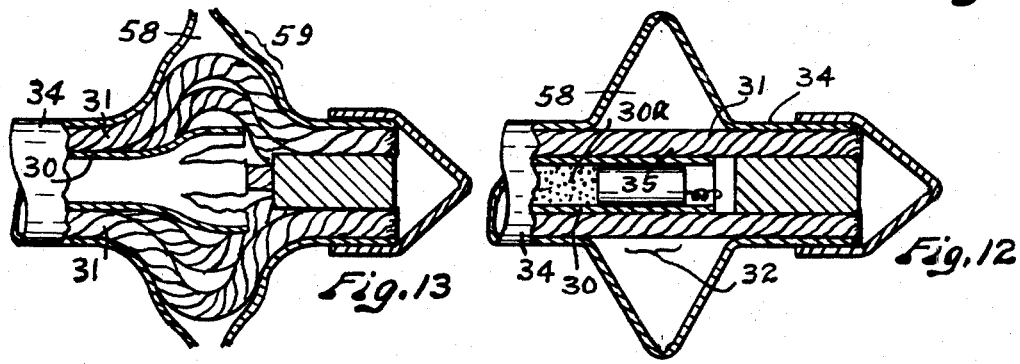
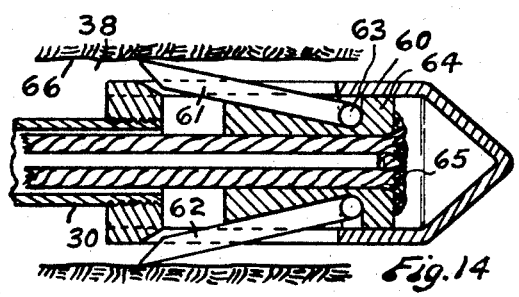
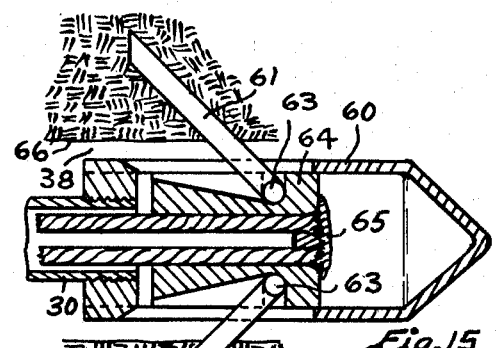
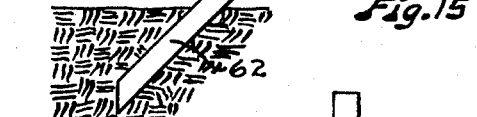
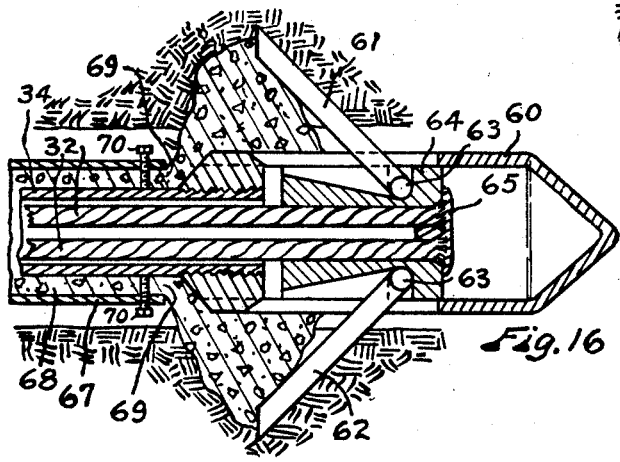
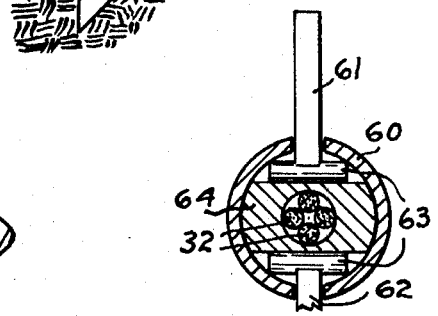
INVENTOR.
Kenneth Ray Taylor
BY
Wright Arnold
ATTORNEY June 25, 1968  K. R. TAYLOR  3,389,561
METHOD OF AND APPARATUS FOR PROVIDING ANCHORS
IN EARTH AND/OR ROCK FORMATIONS
Filed May 23, 1966  3 Sheets-Sheet 3
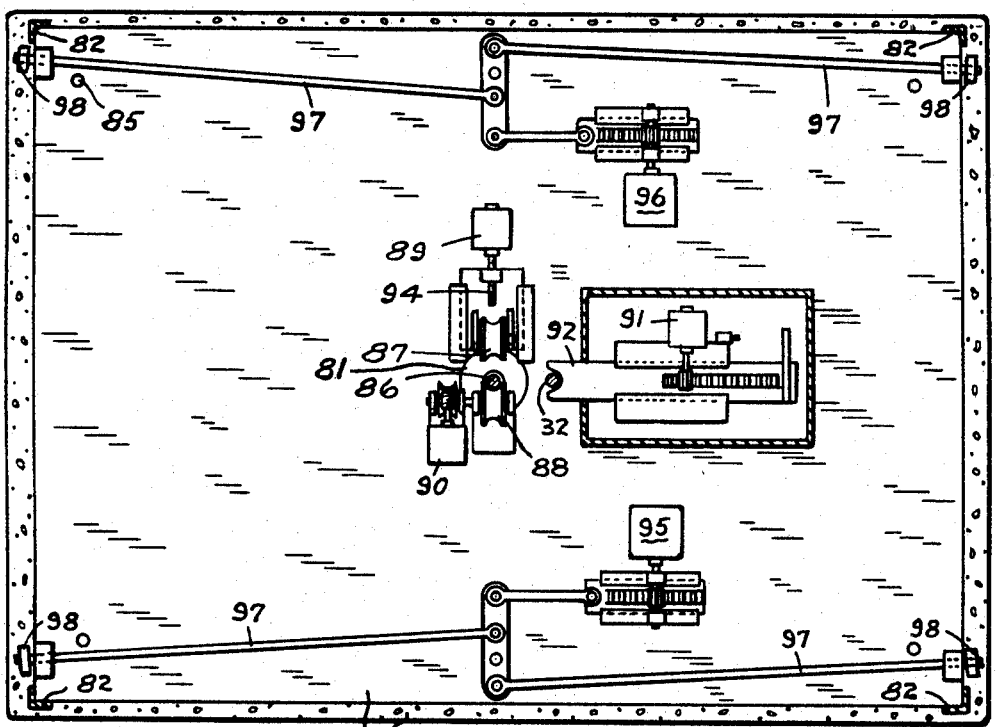
Fig.19
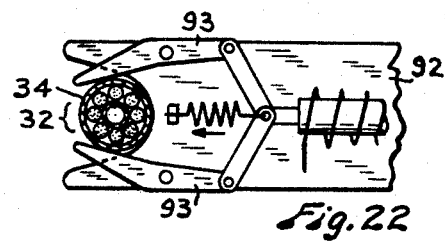
Fig.22
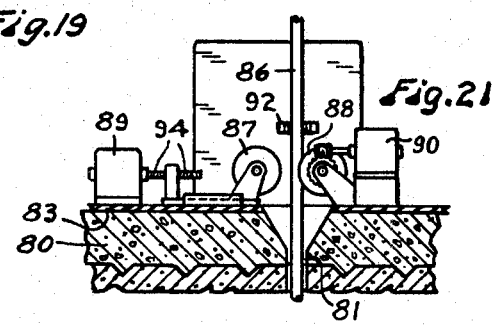
Fig.21
Fig.23
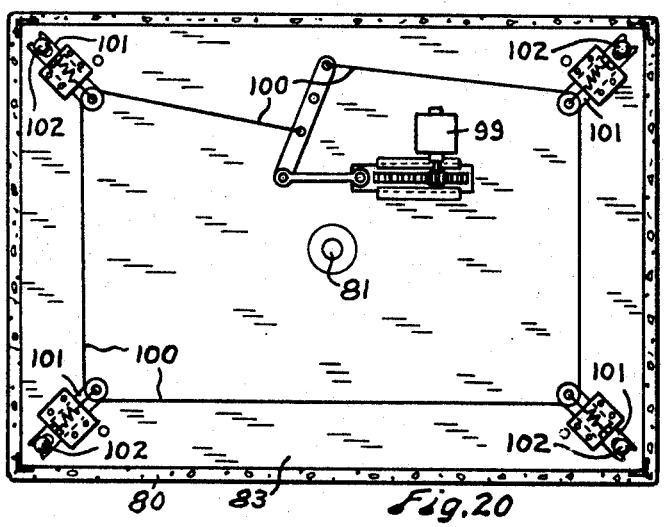
Fig.20
Fig.24
INVENTOR.
Kenneth Ray Taylor
BY
ATTORNEY

United States Patent Office 3,389,561
Patented June 25, 1968

---

3,389,561
METHOD OF AND APPARATUS FOR PROVIDING ANCHORS IN EARTH AND/OR ROCK FORMATIONS
Kenneth Ray Taylor, Renton, Wash., assignor to The English Electric Company Limited, London, England, a British company
Substituted for abandoned application Ser. No. 279,913, May 13, 1963. This application May 23, 1966, Ser. No. 587,938
7 Claims. (Cl. 61—45)

ABSTRACT OF THE DISCLOSURE

A hollow cable insertable into a ground opening. Detonating an explosive within such cable to form an enlargement in an inner portion of the narrow hole, and cause the wire strands of the cable to fan out into the enlargement. Anchoring the fanned out cable in place by introducing concrete or the like into the enlargement through the hollow interior of the cable.

---

This application is a substitute for my prior application Ser. No. 279,913, filed May 13, 1963, and entitled, Method and Apparatus Therefor for Providing an Anchor in the Bank.

The present invention relates to a method and apparatus for providing an anchor in earth and/or rock formations. Typical uses of anchors placed by such method, and/or involving such apparatus, include: for anchoring or retaining an embankment of earth and/or rock against sliding; for anchoring a flume or a road structure to a rock wall; for anchoring marine buoys; and for anchoring floating bridges.

The method of the present invention is characterized essentially by the steps of drilling or otherwise forming a narrow cavity or bore in an earth and/or rock formation in which an anchor is desired, extending inwardly from the surface of such formation to at least the desired location of the anchor; inserting in said cavity a hollow core cable comprising spirally wound strands of wire; discharging an explosive charge in the tube, in the portion thereof contiguous the anchor site, and in that manner explosively enlarging the cavity at the anchor site, and causing the strands of wire to fan out into the enlargement, and delivering concrete mix through the tube into the enlargement, and between and about the fanned out strands of wire.

In preferred form, the apparatus of this invention essentially comprises a tubular core passageway, and a cable means wound thereabout, which apparatus is insertable as an assembly into a tubular cavity formed in an earth and/or rock formation, with said cable means comprising multiple strands of wire wound such that they will separate and fan out when an explosive charge is exploded within said passageway, and with said core passageway being interiorly open, to permit delivery of concrete therethrough, into the region of the fanned out strands of wire.

United States Patent No. 1,746,848, issued Feb. 11, 1930, to Walter A. Bates, discloses forming an anchor by inserting a rigid tube, the lower end portion of which is circumferentially divided into a plurality of lacings, into a drilled hole in the earth, then exploding a charge of dynamite inside said tube in the vicinity of the lacings, and then pouring concrete down the tube into the cavity formed by the explosion and about the lacings. The subject invention constitutes an improvement over the Bates apparatus and technique in that it involves the use of a flexible hollow cable in place of a rigid tube. A cable is inherently stronger than a tube and cannot be broken by strong lateral forces, as it is strictly a tension member and does not have to be designed to withstand a bending moment. Further, compared to a rigid tube, like disclosed by the Bates patent, the helically wound strands of cable wire can be separated easier by, and can better withstand the force of, the explosion. Also, since it is flexible, a cable can be wound onto a spool, whereas a rigid tube cannot.

Other more specific aspects of the invention include the provision of a method of retaining an embankment, a method of anchoring floating units of a floating bridge, methods of forming anchors utilizing anchor means which are expandable by tension applied to a cable, rather than by an explosive force, and also include the apparatus for performing the various methods of this invention.

Anchors formed according to this invention are characterized by a simplicity of construction, and ease of installation, a great reliability of holding fast, and a resistance to soil deterioration.

The above mentioned general objects of my invention, together with others inherent in the same, are attained by the method and mechanism illustrated in its preferred forms, in the following drawings, throughout which like reference numerals indicate like parts, and wherein:

FIG. 1 is a view of an embankment in vertical section, showing two anchors formed according to the invention applied to such embankment;

FIG. 2 is a cross-sectional view of one form of anchor cartridge;

FIG. 3 is a fragmentary longitudinal view, partly in section of the cartridge in FIG. 2;

FIG. 4 is a view like FIG. 2, but of a modified form of anchor cartridge;

FIG. 5 is a view in longitudinal section of the inner terminus of the cartridge of FIGS. 1 and 2, showing the explosive charge;

FIG. 6 is a cross-sectional view of another modified form of cartridge, in which the tension member comprises round rods in place of strands of a cable;

FIG. 7 is a cross-sectional view of still another modified form of cartridge, involving tension members in the form of flat-sided members instead of round rods;

FIG. 8 is a longitudinal view in section illustrating how the rods in the form of FIG. 6 may be held together by welding the members to a face plate, and by the use of bands in areas removed from the face;

FIG. 9 is a view in cross section of a tunnel, showing anchors placed according to the present invention for supporting ceiling members of said tunnel;

FIG. 10 is a view in transverse section of a side portion of a mountain, showing anchors which have been placed according to the present invention used for anchoring a support for a mountain roadway or water flume;

FIG. 11 is a side view of yet another modified form of anchor cartridge, which form includes an exterior protective metal pipe housing provided with weakened slots;

FIG. 12 is a view similar to FIG. 11, but in longitudinal section, and showing the head pulled back by means of the tension members to cause the weakened parts of the metal pipe to expand radially, without employing as yet the explosive charges;

FIG. 13 is a view similar to FIG. 12, but of the assembly after the explosive charge has been set off to open up the strands of the cable;

FIG. 14 is a view in longitudinal section of still another modified form of anchor forming apparatus, according to this invention, such apparatus having expandable flukes shown in a closed or unexpanded condition;

FIG. 15 is a view similar to FIG. 14, showing the flukes in an expanded condition and in an enlarged drilled hole, provided so that concrete can be admitted thereinto around the protective pipe;

FIG. 16 is a view in longitudinal section of yet another modified form of anchor forming apparatus, which is similar to the form of FIGS. 14 and 15, but which includes an inner terminus having a second protective pipe;

FIG. 17 is a cross-sectional view of the modified form of FIG. 16;

FIG. 18 is a view in vertical section of anchoring apparatus for use in very deep water, which apparatus includes a large concrete slab;

FIG. 19 is a plan view of the slab of FIG. 18, showing apparatus mounted thereon for controlling the locating of drill means and cable locating means in the drill hole, and a slab releasing mechanism;

FIG. 20 is a plan view of a modified form of slab type anchoring means, such form employing only one releasing motor;

FIG. 21 is a view in vertical section of apparatus for locating drill pipe in the prepared hole;

FIG. 22 is a view of a detail of gripping means to locate the cable of the invention in the drilled hole, all subject to being controlled from the surface;

FIG. 23 is a vertical view in section of a pin type securing means for the slab of concrete, such means embodying a rod and an eye; and FIG. 24 is a view in vertical section of a modified form of securing means, involving a pin and a yoke.

In FIGS. 2 and 4, for example, a forming tube 30 of plastic or metal is shown functioning as a core member, which defines a passageway 30a, and about which strands 31 of wire are spirally wound to form a cable 32. In FIG. 1, for example, the cable 32 is shown extending from an anchor 33 and is secured to a support plate or member 39 disposed on the face of an embankment. The cable 32 may have a protective pipe 34 either in the form of a tar layer or a tube or sleeve of plastic or metal (FIGS. 2 and 3, for example). Tube 30, which is provided to give form to the passageway 30a, and protective pipe 34 are not stress carrying members, they are easily deformed under load so that the cable 32 remains flexible. In use it is the cable 32 that is stressed, and it is in tension.

Referring to FIG. 5, an explosive charge 35 is shown to be located near the inner end portion of the cable 32. A tapered or conical end cap 40 is preferably added as an addition to pipe 34 to facilitate the introduction of the pipe 34 in the drilled hole 38. An electrical conductor type wire 41 is operatively secured to the explosive charge 35 and is soldered or otherwise secured to a conductor wire 42 which extends outwardly from the hole in which the cartridge is placed to a battery (not shown), used for exploding the charge 35 when desired. The end portion of the strands 31 of the cable 32 are caused, by the explosion, to fan out as shown in FIG. 1. A grounding wire 43 may be provided when plastic tubes are employed.

FIG. 6 shows a modified form of anchor cartridge in which rods 44 are used for tension members in place of the cable 32. FIG. 7 illustrates a further modified form of anchor cartridge, in which the tension member is in the form of flat sided rods 45 in place of round rods. These tension members in the form of round 44 or flat rods 45 find application where the tension member is to be relatively short.

The preferred form of anchor cartridge, involving a cable 32 as the tension member, is more convenient, especially where various lengths of long tension members are involved, because the cable form is subject to being wound on a spool and cut off in desired lengths.

FIG. 8 is a longitudinal view of the rods (round or flat) employed as tension members showing the end portions 46 of said rods welded in a facing member 47 to hold same in an assembled position. Likewise, a band 48 disposed intermediate the length of said rods also may be employed for holding said rods (round or flat) in an assembled position.

FIG. 9 illustrates the application of anchors placed according to the invention to the construction of a tunnel.

Holes 38 are drilled generally radially of the axis of the tunnel and the anchors as above described are applied. The tension members 32 (or rods 44 and 45) of the anchors are then connected to tunnel ceiling support members 49, or the like.

FIG. 10 illustrates the application of the anchors of this invention as supports for a mountain road 50. The same installation may be employed for supporting a water flume. The member or cable 32 of the anchors are each connected to a face member 51. Likewise, another anchor 32, 33 may be used for supporting a brace 52 and its face member 53. The invention elements may be installed by lifting an operator in a sling lowered from the top of the cliff, for example.

FIG. 11 illustrates a further modified form of anchor cartridge, according to this invention. In such form the metal casing 34, housing the cable 32, is provided with an end portion having weakened circumferential members 54, 55, 56 and 57, separated by longitudinal slots, with like members being located on the opposite side. After the anchor cartridge is inserted into the drilled hole 38, the weakened members may be expanded as shown in FIG. 12. This may be done by pulling outwardly on the cable 32 (which as shown is attached to the inner end of the pipe 34), while holding the pipe 34, thereby providing a cavity 58. If the character of the ground is suitable, the installation may stop at this point. If the character of the soil and situation generally does not allow stopping of the installation, an explosive charge 35 may be inserted and exploded to fan out the strands 31 of the cable 32, as shown in FIG. 13. Thereupon raw concrete (i.e., a fluid concrete mix) can be introduced under pressure and caused to fill the cavity 58 and ensnare the fanned out strands 31 to form the anchor 59.

FIGS. 14 and 15 illustrate a still further modified form of anchor forming apparatus according to the present invention. In such form the inner end portion of the tube 30 is provided with a special end means 60 connected to the cable means 32, said end portion having expandable flukes or anchor spikes 61 and 62. In FIG. 14 these flukes 61 and 62 are shown in a closed or retracted position. FIG. 15 illustrates how the fluke 61 and 62 are pulled toward the face of the drilled hole 38 and caused to expand without any explosive force, if so desired. Flukes 61 and 62 may have bars 63 welded thereto on the front side to provide a strong means for pivoting these members against the head 64. Member 65 serves to engage and hold fast the ends of the strands 31 against the head 64.

For the device as applied in FIGS. 14 and 15, the drilled hole 38, with its wall 66, is made especially large. The device is centered longitudinally at the inner end portion by expanding the flukes 61 and 62. Then, if desired, concrete mix may be introduced into the hole 38 and made to surround the outside of the special end means 60, and to fill the area in front of the flukes 61 and 62.

FIG. 16 shows a modified form of fluke type expanding means. The flukes 61 and 62 and mounting are similar to those shown in FIGS. 14 and 15, but a pipe 67, outside of protective pipe 34, defines with pipe 34 a passageway 68 for the introduction of concrete, the same passing from passageway 68 through short duct 69 to a position in front of flukes 61 and 62. Spacers 70 locate the protective pipe 34 medially with respect to the outside pipe 67. The flukes 61 and 62 are pulled back by cable 32 attached to head 64 as in FIGS. 14 and 15.

FIG. 18 shows an anchoring means for portions of a floating bridge, and embodying principles of the present invention. As known to those skilled in the art, a floating bridge spans very deep water. The water is so deep that piers resting on, or anchored in, the bed of the waterway are not practical, due to the great height involved. Thus, floating pontoons are used for supporting the bridge superstructure. The depth of the water may be two hundred and fifty (250') to three hundred and fifty (350') or more feet. This factor plus strong tides and winds present challenging problems regarding anchoring of the floating pontoons.

In applying my invention to anchoring such pontoons, a concrete slab 80 (FIGS. 18 and 19) is preferably constructed on the surface, and is formed to include a preferably centrally located guide hole 31. Over this slab 80 is constructed a pyramid frame 82, with its own base platform 83. The frame 82 is secured to the slab 80 and serves as a means for lowering the slab by cables 84 to the desired location on the bed of the waterway (see FIGS. 18, 19 and 20). Pins 85 on the corners of the slab 80 preferably extend through the said slab and onto the bed rock of the waterway to firmly anchor said slab 80. After the slab 80 has served as a pilot means for locating and drilling the hole 38 for the application of an anchor forming device, the frame 82 is released, by disconnecting its base 83 from the concrete slab 80, and is withdrawn to the surface for further use. The slab 80 is left in place on the bottom of the waterway.

If debris is located on the bottom, as mud or sand, the same first may be cleaned away be means of high pressure water jets as has been done in Lake Washington, Seattle, Wash. Where swift tides and currents are involved, there may be no debris involved as same may be washed away leaving bare rocks. All this depends upon specific situations. It is, of course, preferable to have the slab 80 disposed upon solid rock at the location where the anchor for the pontoon is to be located.

Electrical or air power may be used for operating the drilling mechanism used for forming the anchor hole or cavity. Air power may be more desirable where the work is being done under water.

Regarding drilling of the anchor hole, the drill pipe 86 is held in place by the pyramid frame 82. The drill pipe 86 may be guided and moved downwardly through hole 81 by and between a pair of guide wheels 87 and 88, rotated by motors 89 and 90, respectively, said motors being controlled by electric connections extending to the surface. The drill pipe 86 is positioned with respect to the starting hole 81, while on the surface, and before lowering of the slab 80. Upon the slab engaging the bottom, the motors 89 and 90 are actuated to move the drill pipe downward as it drills to the desired depth.

After completing the drilling, the drill pipe 86 is withdrawn by supporting apparatus at the surface. Then motor 91 is actuated by electric connection with the surface to make yoke 92, and its spring operated arms 93 (see FIG. 22), move a predetermined distance to center the cable 32 with its protective pipe 34 over the drill hole 38. Then motors 89 and 90 are actuated by wires from the surface to engage cable 32 and force said cable into said hole 38 (and its explosive charge 35) to the bottom of the drilled hole 38. The operation of the invention next follows the disclosure as set forth for FIGS. 1, 2, 3, 4 and 5.

Motor 89 operates worm screw 94 which when rotated moves wheel 87 either toward or away from wheel 88, depending on the direction of rotation. Wheels 87 and 88 may be used to force an anchor cartridge of the invention into the drill hole 38.

As best shown by FIGS. 19 and 23, motors 95 and 96 are actuated to release the platform 83 from the slab 80, by withdrawing arms 97 on each corner from its eye screw 98 extending into the slab 80 of concrete.

FIGS. 20 and 24 show a mechanism directed to the same purpose as the mechanism of FIG. 19, i.e. to release the slab 80, but here a single motor 99 serves to operate cables 100 to withdraw a yoke 101 from beneath the knob 102 of pin 102.

The tripod frame 82 (FIG. 18), after being released from the slab, is raised to the surface by cables 84. Thereupon, the tube 32 may be cut and raw concrete may be introduced to form the anchor 33. The hole 81 may be lined to protect against cutting of the tube 34 and its enclosed cable 31, i.e., the cutting of member 32.

The method of applying the invention is set forth in connection with the description of the invention. However, in summary form it may be stated the method in general is as follows: A hole 38 is drilled in the ground, embankment or other earth and/or rock formation. The cable 32 is inserted in the hole 38. An exposive charge 35 is inserted (with or after the member 32) and set off at the inner end portion to make an enlargement for provision of the anchor 33 in the inner end portion of the hole 38. This explosive causes the end portions of the strands 31 of the cable 32 to fan out, so that they can be ensnared in the raw concrete.

Where wire cable is employed, the end of the cable is unwound to the extent of some 18 inches or so and then the charge of dynamite is inserted, with its exploding cap and wire connections, into the hollow interior. The electrical wiring 42 and 43 for exploding the dynamite could be secured to dynamite cap on the inner end of the charge. Conductor wire 41 is attached to wire 42, and is then brought to the surface. Wire 43 is grounded to cable 31.

Where the length of the cable and the length of the drilled hole are large, it would be preferable to tamp in sand 30a in the end of the cable before it is introduced into the drilled hole. Six feet or less of the sand or other explosive force stopper could be inserted to hold the explosive force of the charge of the dynamite. The dynamite is inserted some 18 inches short of the end of the cable 30. Discharging wires 41, 42 and 43 would be run from the cap connected to the charge to the inner end of the cable and then the electrical wire 42 would be extended out to the surface end of the cable by connecting to wire 41. Damp sand 30a would be tamped in the cable for some 6 feet so as to hold the explosive force at the desired location. This, of course, is preferably all done before the cable is introduced into the drilled hole. Then the cable would be introduced and then explosion discharged. After the explosion, the dampened sand could be removed by air. Where the length of the drilled hole is not so extensive, as provided above, the sand may be inserted after the charge is located in the hole.

Relative the explosive charge: Of course, the size of the charge will vary greatly with the situation; whether the soil is sandy, clay or rock, whether or not there is a protective pipe 34 about the cable and other factors. Black stump blast powder may be employed, but convenience will more generally direct the use of dynamite. According to practice, this comes in different quantities of charges. Normally, a 40% gel may be used, but where the condition requires heavier charge, the gel may extend to larger percentages. Where there is tremendous pressure under water, the 60% would be more practical but explosive experts will determine. Of course, it may be stated that any such percentage would require the obtaining of a license from the Fish and Wild Life Department.

Of course, it will take some trial of different charges for the particular location or job to determine the most advantageous quantity. Of course, in order to hold the charge within the inner end of the drilled hole, the charge should have a column of tamped damp sand in order to keep the force of explosion directed against the inner end of the bored hole. Ordinarily, a column of six feet of damp sand should be sufficient to hold the charge of a 40% gel. Sand may be extracted by an air blast so as to leave the hole free for the introduction of raw concrete under pressure.

Applications of the invention are numerous in addition to those already disclosed. Examples of other applications may be illustrated as follows: A series of low flood dams anchored by my invention, disposed transversely of water courses, could serve to hold back enough of the flooding waters for a period of time which would avoid flooding damaging. Such flooding may occur only at rare intervals but the dams embodying my invention, of low cost, would be a continuing protection.

Again, breakwaters or dykes could be anchored by means of my invention and thus avoid the damage of severe storms. At Providence, R.I., the construction of a first hurricane dam costing $17,000,000 has begun. This dam will extend 680 feet across the Providence River. It will keep high tides sparked by hurricanes from flooding a section of the city which lies below sea level.

Floating equipment for dredging oil wells can be anchored by my invention against storm damage.

Such illustrations will serve to suggest other applications.

What is claimed is:

1. A method of providing an anchoring means in an earth and/or rock formation comprising the steps of forming a narrow hole in said formation; inserting in said hole a hollow cable means having a central passageway and comprising strands of cable wires spirally wound about the passageway; discharging an explosive force in said hole, and in that manner forming an enlargement in said narrow hole, and causing the wire strands of the cable to fan out into said enlargement; inserting through the passageway a raw mixture of material which hardens upon setting to fill the said enlargement and to entrap the fanned out strands; and securing said cable to a member to be anchored.

2. A method of providing a retaining means in an embankment comprising the steps of claim 1, and wherein the step of forming said narrow hole comprises drilling such hole in an embankment, and wherein the step of securing the cable to a member to be anchored comprises securing such cable to a support member to be held on the face of said embankment.

3. A method of providing an anchor means to which a floating bridge unit, over a waterway, is attached, comprising the steps of claim 1, preceded by the step of lowering a concrete slab onto the bed of said waterway, and wherein said narrow hole is forming by drilling through a hole in the slab, by means of a drilling rig mounted on the slab and including a stem and drill bit which extend through said hole, and wherein the step of securing the cable to a member to be anchored comprises securing it to a unit of the floating bridge.

4. A method of providing an anchor means in an earth and/or rock formation, comprising drilling a hole in the earth and/or rock formation; inserting into said hole a retaining mechanism having an open central passageway surrounded by wire cable means and including a retracted expandable means which is expandable by a pulling action on the cable means; pulling said cable means while maintaining said mechanism is in place, causing said expanding members to fan out and move diametrically away from the longitudinal axis of the hole; inserting raw concrete mixture through the open passageway to entrap the fanned out members, and form an anchor in said hole; and securing said cable means to a member to be held.

5. Anchor forming apparatus insertable into a tubular cavity formed in an earth and/or rock formation, for forming an anchor in said formation, said means having a central passageway and cable means surrounding said passageway, said cable means comprising multiple strands of wire spirally wound in one direction only such that they will separate and fan out when an explosive charge is exploded in said passageway, and with said passageway being interiorly open, to permit delivery of concrete therethrough, into the region of the fanned out strands of wire, following the explosion; an explosive charge in said passageway inwardly of the hole opening; and means for detonating said charge, including an electrical conductor extending through said open passageway.

6. The apparatus of claim 5, further including a protective coating about said cable.

7. The apparatus of claim 5, further including a tube disposed about said cable.

References Cited

UNITED STATES PATENTS

| 1,746,848 | 2/1930 | Bates | 61—52 |
| 2,162,130 | 6/1939 | Somerville | 57—145 |
| 2,618,192 | 11/1952 | Temple | 61—45 |
| 2,667,037 | 1/1954 | Thomas et al. | 61—45 |
| 2,970,444 | 2/1961 | Peter | 61—45 |
| 3,172,947 | 3/1965 | Fredrickson et al. | 57—145 X |
| 3,212,582 | 10/1965 | Brown | 138—144 X |
| 3,234,723 | 2/1966 | Brown | 57—144 X |

FOREIGN PATENTS

| 1,249,759 | 11/1960 | France. |
| 820,945 | 9/1959 | Great Britain. |

JACOB SHAPIRO, *Primary Examiner.*

D. J. WILLIAMOWSKY, *Examiner.*

UNITED STATES PATENT OFFICE
CERTIFICATE OF CORRECTION

Patent No. 3,389,561                      June 25, 1968

Kenneth Ray Taylor

It is hereby certified that error appears in the above numbered patent requiring correction and that the said Letters Patent should read as corrected below.

In the heading to the printed specification, lines 5 to 7, for "Kenneth Ray Taylor, Renton, Wash., assingor to The English Electric Company Limited, London, England, a British company" read -- Kenneth Ray Taylor, Box 2185, Renton, Wash. 99166 --.

Signed and sealed this 25th day of March 1969.

(SEAL)
Attest:

rd M. Fletcher, Jr.                              EDWARD J. BRENNER sting Officer                                    Commissioner of Patents